Patented July 6, 1948

2,444,882

UNITED STATES PATENT OFFICE 2,444,882

ALPHA BETA DIMETHYLENE SUCCINONITRILE

Pliny O. Tawney, Passaic, N. J., assignor to United States Rubber Company, New York, N. Y., a corporation of New Jersey No Drawing. Application June 13, 1947, Serial No. 754,601

3 Claims. (Cl. 260—465.8)

This invention relates to a new unsaturated dinitrile, to polymers thereof, and to a method for preparing the monomeric compound.

The new compound is $\alpha,\beta$-dimethylenesuccinonitrile, a white solid which melts at 125°–127° C. with sublimation (when heated rapidly to 123° C. and then heated slowly above 123° C.), boils at ca. 80° C./8 mm., and which is readily soluble in various common organic solvents including benzene, dioxane, acetone, and ethanol, and slightly soluble in diethyl ether and in water.

The new compound is useful both as a polymerizable unsaturated monomer and as an intermediate for the synthesis of other compounds.

The new compound polymerizes spontaneously, albeit slowly, even in the solid form at room temperature, and with increasing rapidity upon warming. For example, when an acetone solution of the diene is heated at 60° C. with a catalytic amount of benzoyl peroxide (e. g., 1% by weight on the weight of the acid), a polymer precipitates which is soluble in dimethyl formamide. The polymer displays a highly crystalline X-ray diffraction pattern, and softens, with some decomposition, in the range 260°–270° C.

Previous workers have attempted to prepare the new compound of this invention but were unsuccessful. I have now discovered that it can be prepared by the thermal decomposition of lower monocarboxylic acid esters of 2,3-butanedione bis-cyanohydrin as illustrated in the following equation, R being hydrogen or a hydrocarbon group containing from one to six carbon atoms: e. g., methyl, ethyl, propyl, isopropyl, butyl and phenyl:

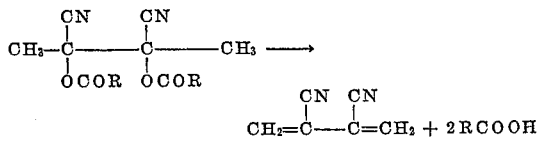

This pyrolytic cracking reaction is carried out by conducting the vapors of the di-ester of 2,3-butanedione bis-cyanohydrin through a hot zone at temperatures sufficient to effect removal of the elements of the carboxylic acid, e. g., at 400–500° C. and at a rate which will minimize polymerization and other deleterious chemical reactions of the product; contact times of from 5 to 15 seconds, and preferably from 5 to 12 seconds, are used.

Since the starting materials are moderately high-melting solids, they are preferably dissolved in a non-reactive solvent; e. g., acetic acid or acetone, to facilitate their introduction into the reaction vessel, and the vapors thereof may be further diluted with an inert gas, e. g., nitrogen. The reaction may also be carried out under reduced pressure, if desired.

The hot gaseous mixture issuing from the reaction vessel is condensed, and after removal of the diluents, the $\alpha,\beta$-dimethylenesuccinonitrile can be isolated from the residue by any conventional procedure; e. g., fractional distillation, crystallization, etc. Since this new diene sublimes readily, this characteristic can also be employed with advantage in its isolation and purification.

This new conjugated diene polymerizes readily, and this reaction is promoted by heat and/or polymerization catalysts; e. g., peroxides.

The following example discloses my invention in more detail. All parts are by weight.

Example

A hot (100° C.) solution of 140 parts of 2,3-butanedione bis-cyanohydrin diacetate in 346 parts of glacial acetic acid is gradually admitted to a pyrolysis tube comprising a 40-inch length of 30 mm. Pyrex glass tubing packed with 3–8 mesh quartz chips and maintained at 470° C. The solution is introduced into the reaction tube at such a rate as to provide a contact time of approximately 5.0 seconds, based on the volume of free space in the tube. The hot effluent gases are condensed in a receiver which is cooled by Dry Ice and contains 0.1 part of hydroquinone as a polymerization inhibitor.

The condensate is warmed to room temperature, and solid unreacted starting material present is removed by filtration. The filtrate is then evaporated at 55 mm. pressure to remove the majority of the acetic acid, and the residue is again filtered to remove additional starting material which has precipitated. This filtrate is then fractionally distilled to yield the $\alpha,\beta$-dimethylenesuccinonitrile which distills, with considerable sublimation, at approximately 80° C./8 mm.

|  | Per cent C | &N |
|---|---|---|
| Analysis: |  |  |
| Found | 69.22 | 27.08 |
| Theory | 69.28 | 26.91 |

Having thus described my invention, what I claim and desire to protect by Letters Patent is:
1. $\alpha,\beta$-Dimethylenesuccinonitrile.
2. A method of preparing $\alpha,\beta$-dimethylenesuc- cinonitrile which comprises heating a lower monocarboxylic diester of 2,3-butanedione bis-cyanohydrin for about 5 to 15 seconds in a reaction zone maintained at a temperature between 400° and 500° C., removing the products from the reaction zone, and recovering $\alpha, \beta$-dimethylenesuccinonitrile.

3. A method of preparing $\alpha, \beta$-dimethylenesuccinonitrile which comprises continuously passing the vapor of 2,3-butanedione bis-cyanohydrin diacetate through a reaction zone maintained at a temperature of about 470° C., at such a rate that the vapor remains in the reaction zone for about 5 to 15 seconds, removing the products from the reaction zone, and recovering $\alpha, \beta$-dimethylenesuccinonitrile.

PLINY O. TAWNEY.

REFERENCES CITED

The following references are of record in the file of this patent:

UNITED STATES PATENTS

| Number | Name | Date |
|---|---|---|
| 2,328,890 | Clifford et al. | Sept. 7, 1943 |